US007368507B2

(12) United States Patent
Takamura et al.

(10) Patent No.: US 7,368,507 B2
(45) Date of Patent: May 6, 2008

(54) GRAFT COPOLYMER, COMPOSITION CONTAINING THE SAME AND MOLDED OBJECT THEREOF, AND PROCESS FOR PRODUCING THE SAME

(75) Inventors: Masumi Takamura, Handa (JP); Hitoshi Uchida, Okazaki (JP); Yoshiki Yamamoto, Aichi (JP); Motoyuki Sugiura, Anjo (JP)

(73) Assignee: NOF Corporation, Tokyo (JP)

( * ) Notice: Subject to any disclaimer, the term of this patent is extended or adjusted under 35 U.S.C. 154(b) by 375 days.

(21) Appl. No.: 10/532,799

(22) PCT Filed: Oct. 23, 2003

(86) PCT No.: PCT/JP03/13525

§ 371 (c)(1), (2), (4) Date: Apr. 25, 2005

(87) PCT Pub. No.: WO2004/037876

PCT Pub. Date: May 6, 2004

(65) Prior Publication Data

US 2005/0261436 A1 Nov. 24, 2005

(30) Foreign Application Priority Data

Oct. 25, 2002 (JP) ............................ 2002-311361

(51) Int. Cl.

| | |
|---|---|
| ***C08F 255/02*** | (2006.01) |
| ***C08F 255/04*** | (2006.01) |
| ***C08F 255/06*** | (2006.01) |
| ***C08F 8/46*** | (2006.01) |

(52) U.S. Cl. ...................... 525/285; 525/240; 525/242

(58) Field of Classification Search ................ 525/285, 525/240, 242

See application file for complete search history.

(56) References Cited

U.S. PATENT DOCUMENTS 5,955,547 A * 9/1999 Roberts et al. ............. 525/285

FOREIGN PATENT DOCUMENTS

| | | | |
|---|---|---|---|
| JP | 2-51455 | | 11/1990 |
| JP | 6-172459 | | 6/1994 |
| JP | 7-126445 | | 5/1995 |
| JP | 2885919 | | 2/1999 |
| JP | 2000-159843 | | 6/2000 |
| JP | 2004051649 | * | 2/2004 |

* cited by examiner

*Primary Examiner*—Randy Gulakowski
*Assistant Examiner*—Olga Asinovsky
(74) *Attorney, Agent, or Firm*—Wenderoth, Lind & Ponack, L.L.P.

(57) ABSTRACT

A graft copolymer having a structure in which a vinyl copolymer segment formed from a vinyl monomer having an acid is suspended in a molecular chain of a polyolefin resin segment via a β-substituted propylene group is obtained, by reaction of polyolefin resin having β-substituted propenyl group as a pendant and a vinyl monomer having an acid, and further a graft copolymer composition containing the same and a molded product thereof are obtained.

The obtained graft copolymer, the composition containing the same and the molded product thereof are excellent in adhesive property to a polar material and scratch resistance.

18 Claims, No Drawings

GRAFT COPOLYMER, COMPOSITION CONTAINING THE SAME AND MOLDED OBJECT THEREOF, AND PROCESS FOR PRODUCING THE SAME

TECHNICAL FIELD

The present invention relates to a graft copolymer excellent in adhesion to a polar material and scratch resistance, a composition containing the same and a molded product thereof, and a method for producing the graft copolymer.

BACKGROUND ART

Among thermoplastic resins, polyolefin resin enables light weight and good cost efficiency and is excellent in moldability, chemical resistance, and mechanical strength, and thus it is used for various applications as film, fiber, and molding material.

However, since polyolefin resin has low polarity and small intermolecular force, it has problems in that coating property, adhesive property to and compatibility with polar material, and scratch resistance are inferior.

To solve these problems, a lot of copolymer compositions in which a vinyl monomer having an acid is generally grafted are proposed.

For example, to improve adhesive property of polyolefin resin, a graft copolymer in which a vinyl polymer segment formed from a vinyl monomer having carboxylic acid is directly bonded to polypropylene resin segment is proposed (see Patent Document 1: Japanese Patent No. 2885919, page 2 to 3).

Further, to improve adhesive property and scratch resistance of thermoplastic elastomer, proposed is a method of blending a graft copolymer with thermoplastic elastomer, the graft copolymer in which a vinyl polymer segment formed from a vinyl monomer having carboxylic acid is directly bonded to ethylene•α-olefin copolymerized rubber segment (see Patent Document 2: Japanese Patent Publication No. 2-51455 (page 3)).

However, in the graft copolymer disclosed in Patent Documents 1 and 2, since the vinyl copolymer segment formed from a vinyl monomer having carboxylic acid is directly bonded to polypropylene resin or ethylene•α-olefin copolymerized rubber, the improvement effects on adhesive property and scratch resistance are not sufficient and further improvements have been expected.

Furthermore, the graft copolymers disclosed in these documents are produced by a method in which the vinyl monomer is directly reacted through grafting with the polyolefin resin using a polymerization initiator, and thus they have some problems in that the reactivity during graft reaction is low and side reaction such as disintegration or crosslinking of polyolefin resin occurs during the reaction. It is thus considered that a graft copolymer having excellent properties is hard to be obtained by these methods.

DISCLOSURE OF THE INVENTION

It is an object of the present invention to provide a graft copolymer excellent in adhesive property to a polar material and scratch resistance, a composition containing the same and a molded product thereof, and a method for producing the graft copolymer.

To achieve the above object, the graft copolymer of the present invention has a structure in which a vinyl copolymer segment formed from a vinyl monomer having an acid is suspended via β-substituted propylene group in a molecular chain of a polyolefin resin segment.

The present invention further provides a graft copolymer resin composition containing the graft copolymer and a molded product thereof.

The present invention furthermore provides a method for producing the graft copolymer. In that method, a vinyl monomer having an acid is reacted with polyolefin resin having a β-substituted propenyl group as a pendant.

BEST MODE FOR CARRYING OUT THE INVENTION

A graft copolymer of the present invention having a structure in which a vinyl polymer segment formed from a vinyl monomer having an acid is suspended from a polyolefin resin segment via a β-substituted propylene group, preferably a β-substituted propylene group of the chemical formula (A).

[Formula A]

$$-CH_2-\underset{}{\overset{R^1}{\overset{|}{C}H}}-CH_2- \quad (A)$$

In the formula (A), $R^1$ represents a phenyl group, a cyano group, or an alkylester group (—COOR‴, wherein R‴ represents an alkyl group having 1 to 4 carbon atoms).

Examples of the above β-substituted propylene group include a 2-phenyl-1,3-propylene group, a 2-cyano-1,3-propylene group, and a 2-acetoxy-1,3-propylene group. Among them, 2-phenyl-1,3-propylene group is preferable.

The amount of β-substituted propylene group contained in the graft copolymer is, for example, calculated from the amount of methine group bonded to β-substituted group, obtained from $^1$H-NMR of the graft copolymer. The preferable amount of β-substituted propylene group is 0.1 to 15% by weight in the graft copolymer. When the amount of the β-substituted propylene group is less than 0.1% by weight in the graft copolymer, the performances of the graft copolymer such as adhesive properties and scratch resistance are relatively low, and it is unfavorable. Further, when the amount of the β-substituted propylene group in the graft copolymer exceeds 15% by weight, the desirable properties of polyolefin resin cannot be obtained.

The polyolefin resin segment constituting the graft copolymer is a homopolymer of α-olefins having two or more carbon atoms, such as ethylene, propylene, 1-butene, 1-hexene, 4-methyl-1-pentene, and 1-octene (hereinafter abbreviated as α-olefins), a copolymer of two or more α-olefins, a copolymer of α-olefin and other vinyl monomer, or a mixture thereof.

Among them, polyethylene resins, polypropylene resins, or olefin elastomers are preferable from an economical viewpoint, and in particular, olefin elastomers synthesized with a metallocene catalyst is more preferable.

Hereafter, each resin will be described in detailed.

As the polyethylene resin, a homopolymer of polyethylene, a copolymer containing 80 or more % by mol of polyethylene, or a mixture thereof can be used.

Specific examples thereof include a low density polyethylene, a linear low density polyethylene, and a high density polyethylene.

In addition, the polyethylene resins usually having a melt flow rate of 0.01 to 100 g/10 min. (JIS K 7210: 190° C., 2.16 kg of load) and a density of 0.88 to 0.98 g/cm$^3$ (ASTM D 1505) are preferable from a viewpoint of the production.

As the polypropylene resin, a homopolymer of polypropylene, a copolymer containing 80 or more % by mol of polypropylene, or a mixture thereof can be used. Among them, a random or block copolymer of propylene-ethylene containing 1 to 10% by weight of ethylene is preferable. In addition, the polypropylene resins usually having a melt flow rate of 0.01 to 100 g/10 min. (JIS K 7210: 230° C., 2.16 kg of load) are preferable from a viewpoint of the production.

As the olefin elastomer, usable are a copolymer rubber of 2 or more kinds of α-olefin, or a copolymer of α-olefin and vinyl monomer, and a mixture or partially crosslinking substance thereof, and further an olefin thermoplastic elastomer, that is a mixture of these products, and a polyethylene resins or a crystalline polyolefin resin such as crystalline polyolefin resin.

Specific examples thereof include: ethylene-α-olefin copolymer rubbers such as ethylene-propylene copolymer rubber, ethylene-butene copolymer rubber, ethylene-octene copolymer rubber, and ethylene-propylene-diene copolymer rubber; ethylene-vinyl acetate copolymer rubber; and ethylene-glycidyl methacrylate copolymer.

Among the above-mentioned olefin elastomers, preferable are ethylene-α-olefin copolymer rubbers such as ethylene-propylene copolymer rubber, ethylene-butene copolymer rubber, ethylene-octene copolymer rubber, and ethylene-propylene-diene copolymer rubber. Among them, ethylene-octene copolymer rubber and ethylene-propylene-diene copolymer rubber using a metallocene catalyst are more preferable.

The vinyl polymer segment which constitutes the graft copolymer of the present invention and is formed from a vinyl monomer having an acid is an addition polymer in which one or more molecules of a vinyl monomer having an acid are polymerized.

As the vinyl monomer having an acid, vinyl monomers having carboxylic acids, vinyl monomers having carboxylic acid anhydrides, vinyl monomers having sulfonic acids, and vinyl monomers having phosphoric acids are preferable in terms of adhesive properties to and compatibility with polar materials, and further scratch resistance.

Specific examples of vinyl monomers having carboxylic acids include methacrylic acid, maleic acid, fumaric acid, itaconic acid, crotonic acid, and methyltetrahydrophthalic acid.

Specific examples of vinyl monomers having carboxylic acid anhydrides include maleic anhydride, itaconic anhydride, methyltetrahydrophthalic anhydride, and endomethylenetetrahydrophthalic anhydride.

Specific examples of vinyl monomers having sulfonic acids include methacryl sulfonate, vinyl sulfonate, and p-styrene sulfonate.

Specific examples of vinyl monomers having phosphoric acids include ethylene glycol methacrylate phosphate and polyethylene glycol methacrylate phosphate.

Among these vinyl monomers having acids, use of vinyl monomers having carboxylic acids or carboxylic acid anhydrides is preferable for the present invention in terms of the acid content in the graft copolymer. In particular, use of acrylic acid and maleic anhydride is most preferable.

Further, vinyl monomers having these acids may be used either alone or in combination of two or more kinds thereof.

The amount of vinyl polymer segment which is formed from the vinyl monomer having an acid and contained in the graft copolymer of the present invention can be calculated, for example, from a peak height of infrared absorption spectrum of the acid obtained by FT-IR.

The amount of the vinyl polymer segment formed from the vinyl monomer having an acid is preferably in the range of 0.1 to 30% by weight in the graft copolymer, more preferably 1 to 20% by weight. When the amount thereof is less than 0.1% by weight, the performances of the graft copolymer such as adhesive properties and scratch resistance are relatively low, and it is unfavorable. Further, greater than 30% by weight of the acid is unfavorable, because the properties of polyolefin resin cannot be obtained.

In terms of molecular weight, the graft copolymer of the present invention preferably has a number average molecular weight obtained by styrene conversion of 1,000 to 10,000,000, and more preferably 2,000 to 5,000,000 obtained by high temperature GPC (Column: Toso TSKgel GMHHR-H(20)HTx2, column temperature: 135° C., detector temperature: 135° C., sample temperature: 135° C., pump: 60° C., injection volume: 100 μl, solvent: orthodichlorobenzene, analytical time: 30 minute).

When the number average molecular weight is less than 1,000, the mechanical properties are relatively low, and it is unfavorable. Further, when the number average molecular weight is greater than 10,000,000, the reforming effects become insufficient, and it is unfavorable.

The graft copolymer of the present invention may contain byproduct compounds generated during the production of the graft copolymer, that is to say, non-grafted polyolefin resins, vinyl polymer formed from the vinyl monomer having an acid, a decomposition product or a gel of polyolefin resin.

A graft copolymer composition containing the graft copolymer of the present invention can contain two or more kinds of graft copolymers.

Above all, more preferable is a mixture of: a graft copolymer composed of a polypropylene resin and a vinyl polymer segment formed from a vinyl monomer having an acid; and a graft copolymer composed of an olefin elastomer segment and a vinyl polymer segment formed from a vinyl monomer having an acid. This is because the combination of them exhibits properties intermediate between resin and rubber as the combination attracts attention in a new field called as polyolefin thermoplastic elastomer.

For the purpose of controlling the acid amount, a polyolefin resin can be newly added to the graft copolymer composition of the present invention.

Further, the addition of polyolefin resin can uniformly disperse the graft copolymer in the graft copolymer composition and enhance an application property, an adhesive property to dissimilar materials, scratch resistance, and wear resistance.

As the polyolefin resin to be added at this time, the above-mentioned polyolefin resin and a mixture thereof can be used.

The mixing ratio of the graft copolymer and polyolefin resin (graft copolymer/polyolefin resin) can be arbitrarily changed in the range of 99.5/0.5 to 0.5/99.5.

Particularly, from an economical view point, the mixing ratio is preferably 50/50 to 0.5/99.5

When the weight ratio of the graft copolymer contained in a graft copolymer composition is less than 0.5%, the scratch resistance and wear resistance of the graft copolymer composition are relatively low and it is not undesirable. On the other hand, when the weight ratio of the polyolefin resin contained in the graft copolymer composition is less than 0.5%, the above-mentioned reforming effect by addition of polyolefin is hard to be obtained.

For the purpose of enhancing scratch resistance or wear resistance, it is preferable that the graft copolymer composition of the present invention is partially crosslinked.

As crosslinking methods, there can be either of the following methods or a combination thereof: a method for intramolecular and intermolecular crosslinking by ionic bond using a metal salt or an organic amine by use of the acid of the graft copolymer composition; and a method for intramolecular and intermolecular crosslinking by covalent bond using an organic peroxide or sulfur by use of the polyolefin resin segment of the graft copolymer composition.

Examples of metal salt to be used for crosslinking method by ionic bond include sodium salts, calcium salts, magnesium salts, zinc salts, lithium salts, and aluminum salts. In addition, examples of the organic amines include n-hexylamine, hexamethylenediamine, and 1,3-bis(aminomethyl) cyclohexane.

Among them, from a viewpoint of moldability and scratch resistance and wear resistance, metal salts are preferable, and magnesium salts, zinc salts, and aluminum salts are more preferable.

Further, as methods for neutralizing the acid of the graft copolymer composition by a metal salt or an organic amine, any of the following methods can be used: a method for neutralizing a vinyl monomer having an acid by a metal salt or an organic amine before producing the graft copolymer composition; a method for neutralizing an acid of the graft copolymer composition by a metal salt or an organic amine after graft reaction; and a method for neutralizing by a metal salt or an organic amine after polyolefin resin is further added into the graft copolymer composition.

The addition of metal salt or organic amine has an upper limit of equimolar amount based on the amount of the acid of the graft copolymer composition.

Specific examples of organic peroxides to be used for the method for crosslinking by covalent bond include dicumyl peroxide, α,α'-bis(t-butylperoxy)diisopropylbenzene, 2,5-dimethyl-2,5-bis(t-butylperoxy)hexane, 2,5-dimethyl-2,5-bis(t-butylperoxy)hexyne-3, 1,1-bis(t-butylperoxy)3,3,5-trimethylcyclohexane, t-butylperoxybenzoate, and benzoyl peroxide.

Among them, from a viewpoint of enhancing scratch resistance, wear resistance, and tensile property of the graft copolymer composition, dicumyl peroxide, α,α'-bis(t-butylperoxy)diisopropylbenzene, 2,5-dimethyl-2,5-bis(t-butylperoxy)hexane, and 2,5-dimethyl-2,5-bis(t-butylperoxy) hexyne-3 are preferable.

Specific examples of sulfur to be used for the method for crosslinking by covalent bond include organic sulfur donors such as tetramethylthiuramdisulfide and 4,4-dithiobis(morpholine) in addition to simple substance sulfur such as insoluble sulfur and colloidal sulfur.

Among them, from the aspect of versatility and economical efficiency, simple substance sulfur such as insoluble sulfur and colloidal sulfur is more desirable.

Here, the amount of crosslinking agent to be added is not greater than 10 parts by weight and more preferably not greater than 5 parts by weight, based on 100 parts by weight of graft copolymer composition. Addition of more than 10 parts by weight of crosslinking agent lowers the moldability of the graft copolymer composition, and it is not preferable.

For the purpose of enhancing, especially, scratch resistance, wear resistance and tensile property, a crosslinking co-agent can be further added to the graft copolymer composition of the present invention when crosslinking is conducted by a crosslinking agent such as organic peroxides and sulfur.

As the crosslinking co-agent, usable are: a dimer or trimer of a vinyl monomer to be used in crosslinking by an organic peroxide, or a crosslinking accelerator used in crosslinking by sulfur; an activator; and a retarder.

Specific examples of the dimer or trimer of a vinyl monomer include divinylbenzene (ortho-, meta-, and para-), ethyleneglycoldi(meth)acrylate, trimethylolpropanetri (meth)acrylate, and diallyl phthalate.

Among them, divinylbenzene (not limited to any of ortho-, meta-, and para-), ethyleneglycoldi(meth)acrylate, and trimethylolpropanetri(meth)acrylate are preferable.

These may be used either alone or by mixing two or more kinds thereof.

Specific examples of the crosslinking accelerator include sulfenamide, benzothiazole, guanidine, and dithiocarbamic acid.

Specific examples of the activator include metal oxides such as zinc oxide and magnesium oxide, aliphatic acids such as stearic acid.

Specific examples of the retarder include acids such as phthalic anhydride and salicylic acid, and nitroso compounds such as N-nitroso diphenylamine.

These can be properly used according to required properties, and also either alone or by mixing two or more kinds thereof.

Here, the amount of crosslinking co-agent to be added is not greater than 10 parts by weight and more preferably not greater than 5 parts by weight, based on 100 parts by weight of graft copolymer or a composition thereof. Addition of more than 10 parts by weight of crosslinking co-agent lowers the moldability of the graft copolymer composition.

For the purpose of enhancing, especially, scratch resistance and wear resistance, a lubricant can be added to the graft copolymer composition of the present invention.

Specific examples of the lubricant include: hydrocarbons such as paraffin wax and polyethylene wax; aliphatics such as stearic acid; higher alcohols such as stearyl alcohol; amides such as oleic amide, ethylenebis (oleamide); esters such as monoglyceride stearate; metal soaps such as zinc stearate; silicones such as silicone oil; and alkylene glycols such as polyethylene glycol and polyethylene glycol monomethylether. In particular, from a viewpoint of enhancing scratch resistance and wear resistance of the graft copolymer composition, hydrocarbons, amides, silicones, and alkylene glycols are preferable.

The amount of lubricant to be added is preferably not less than 0.1 and not greater than 30 parts by weight based on 100 parts by weight of graft copolymer composition. When the amount thereof exceeds 30 parts by weight, the properties of polyolefin cannot be obtained. When the amount is less than 0.1 parts by weight, improvement effects of scratch resistance and wear resistance cannot be observed.

Moreover, as long as it does not deviated from the objects of the present invention, the graft copolymer composition of the present invention, if necessary, can contain: flame retardants including phosphorous compounds and halogen-containing compounds such as halogenated styrene; fortified fillers such as carbon fiber, mica and talc; antioxidants such as phenolic ones, thioether ones and phosphorus ones; plasticizers such as phthalic esters, adipic esters, phosphate esters, polyesters, and mineral oils; stabilizers; dispersants; foaming agents; ultraviolet ray inhibitors; and coloring agents.

Next, a method for producing the graft copolymer composition of the present invention will be described.

The graft copolymer composition of the present invention can be produced by reacting a vinyl monomer having an acid with polyolefin resin having β-substituted propenyl group as a pendant.

Here, as polyolefin resin having β-substituted propenyl group as a pendant, usable is, for example, a product which is produced as a residual chain by removing tertiary radical from a skeleton of an addition-fragmentation chain transfer agent after the addition-fragmentation chain transfer agent is reacted with a polymer radical of a polyolefin molecule generated in polyolefin resin.

Specific examples of β-substituted propenyl group include a 2-phenyl-1-propenyl group, a 2-cyano-1-propenyl group, and a 2-acetoxy-1-propenyl group.

Among them, from a viewpoint of preventing a main chain from being cut, 2-phenyl-1-propenyl group is preferable.

Moreover, the addition-fragmentation chain transfer agent is not particularly limited and all of known chain transfer agents having properties of addition cleavage type can be used. Among them, an addition-fragmentation chain transfer agent represented by the chemical formula (B) is preferable.

[Formula B]

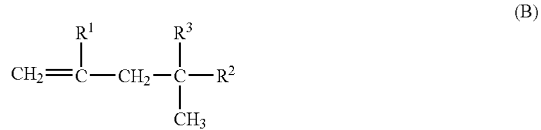

In the formula (B), $R^1$ and $R^2$ represent a phenyl group, a cyano group or an alkyl ester group (in —COOR‴, R‴ represents an alkyl group having 1 to 4 carbon atoms), and $R^3$ represents a hydrogen group or a methyl group.

Specific examples of the addition-fragmentation chain transfer agent include: styrene chain transfer agents such as 2,4-diphenyl-4-methyl-1-pentene, 2-phenyl-4-cyano-4-methyl-1-pentene, and α-(methyl 2-methyl-propanoate)styrene; acrylonitrile chain transfer agents such as 2,4-dicyano-1-pentene and α-(methyl 2-methylpropanoate)acrylonitrile; methyl acrylate chain transfer agents such as α-(2-phenylpropyl)methyl acrylate and α-(2-methylpropanoic acid methyl)methyl acrylate.

Among them, from a viewpoint of the introduction ratio of β-substituted propenyl group, a styrene addition-fragmentation chain transfer agent having $R^1$ of a phenyl group in the chemical formula (B) is preferable. In particular, from an economical point of view, 2,4-diphenyl-4-methyl-1-pentene and 2-phenyl-4-cyano-4-methyl-1-pentene are more preferable.

The addition amount of addition-fragmentation chain transfer agent used herein is preferably 0.2 to 40 parts by weight and more preferably 0.5 to 20 parts by weight based on 100 parts by weight of polyolefin resin.

When the addition amount of addition-fragmentation chain transfer agent is less than 0.2 parts by weight, the graft copolymer composition unfavorably has relatively low adhesive property to a vinyl polymer segment formed from a vinyl monomer having an acid and declined scratch resistance. On the other hand, when the addition amount thereof exceeds 40 parts by weight, the properties of polyolefin resin cannot be obtained and it is not preferable.

In producing polyolefin having β-substituted propenyl group as a pendant, a radical polymerization initiator or a radical scavenger can be used in combination.

Here, as the radical polymerization initiator or radical scavenger, compounds described below can be used in copolymerizing polyolefin resin having β-substituted propenyl group as a pendant and a vinyl monomer having an acid.

The graft copolymer of the present invention can be obtained by reacting polyolefin resin having β-substituted propenyl group as a pendant with a vinyl monomer having an acid. A method for reacting them with each other is not particularly limited and any method can be used as long as polyolefin resin having β-substituted propenyl group as a pendant and an acid-containing monomer, etc. are fully mixed and reacted with each other.

The reaction can be conducted, for example, by ultraviolet irradiation, but a method for reacting by heating and mixing is most preferable from a viewpoint of reaction efficiency.

In reacting polyolefin resin having β-substituted propenyl group as a pendant with a vinyl monomer having an acid by heating, it is preferable to conduct the reaction in the presence of a radical polymerization initiator. Here, the radical polymerization initiator usable means all of known compounds that generate radical.

Specific examples of the radical polymerization initiator include dicumyl peroxide, α,α'-bis(t-butylperoxy)diisopropylbenzene, 2,5-dimethyl-2,5-bis(t-butylperoxy)hexane, 2,5-dimethyl-2,5-bis(t-butylperoxy)hexyne-3, 1,1-bis(t-butylperoxy)3,3,5-trimethylcyclohexane, benzoyl peroxide, ammonium persulfate, potassium persulfate, sodium persulfate, 2,2-azobisisobutyronitril, and 2,2-azobisisovaleronitrile.

Among them, from a viewpoint of enhancing the introduction ratio of acid in the graft copolymer composition, dicumyl peroxide, α,α'-bis(t-butylperoxy)diisopropylbenzene, 2,5-dimethyl-2,5-bis(t-butylperoxy)hexane, and 2,5-dimethyl-2,5-bis(t-butylperoxy)hexyne-3 are preferable.

Here, the addition amount of radical polymerization initiator is not greater than 10 parts by weight and more preferably 0.1 to 5 parts by weight based on 100 parts by weight of polyolefin resin having β-substituted propenyl group as a pendant. When the addition amount thereof exceeds 10 parts by weight, the polyolefin resin having β-substituted propenyl group as a pendant is easily disintegrated or crosslinked and thus it is not preferable.

For the purpose of preventing gelation or resin deterioration, a radical scavenger is preferably used in heating and mixing after adding a vinyl monomer having an acid to polyolefin resin having β-substituted propenyl group as a pendant.

Specific examples of the radical scavenger include: primary antioxidants such as 2,6-di-t-butyl-4-methylphenol and tetrakis-[methylene-3-(3,5-di-t-butyl-4-hydroxyphenyl) propionate]methane; secondary antioxidants such as di-lauryl thio-di-propionate and tris-nonylphenyl-phosphite; and nitroxide compounds. These are used either alone or in combination of two or more kinds thereof.

Among them, a nitroxide compound represented by the chemical formula (C) is preferable since gelation is effi ciently prevented in obtaining the graft copolymer composition.

[Formula C]

(C)

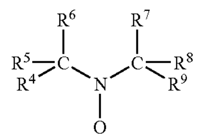

In the formula (C), $R^4$, $R^5$, $R^8$, and $R^9$ represent a straight chain or branched alkyl group, an aromatic-substituted alkyl group, an aromatic group, or an alkyl-substituted aromatic group. Further, $R^6$and $R^7$may be independent or coupled with each other to form a cyclic structure, and each represents a straight chain or branched alkyl group, a hydroxyalkyl group, an alkoxyalkyl group, an alkylcarbonyloxy group, a cyano group, a carboxyl group, an alkyloxycarbonyl group, a benzoyloxy group, an alkoxy group, an amino group, a hydroxyl group, a nitro group, a sulfonic group, a phosphate group, or an aromatic group.

Specific examples of the nitroxide compound represented by the formula (C) include di-t-butylnitroxide, N-t-butyl-1-diethylphosphono-2,2-dimethylpropylnitroxide, 2,2,5,5-tetramethylpyrrolidinyl-1-oxy, 2,2,6,6-tetramethylpiperidinyl-1-oxy, and 2,2,6,6-tetramethyl-5-hydroxypiperidinyl-1.

Among the above-mentioned nitroxide compounds, 2,2,6,6-tetramethylpiperidinyl-1-oxy and 2,2,6,6-tetramethyl-5-hydroxypiperidinyl-1-oxy are particularly preferable.

Here, the addition amount of nitroxide compound is not greater than 10 parts by weight and more preferably 0.1 to 5 parts by weight based on 100 parts by weight of polyolefin resin having β-substituted propenyl group as a pendant. When the addition amount thereof exceeds 10 parts by weight, the acid introduction ratio in the graft copolymer composition unfavorably decreases.

In reacting polyolefin resin having β-substituted propenyl group as a pendant with a vinyl monomer having an acid in the present invention, a method of heating in combination with a radical polymerization initiator and a radical scavenger is more preferable combination from a standpoint of the reaction efficiency and the prevention of gelation or deterioration of resin.

In heating and mixing after adding a vinyl monomer having an acid to polyolefin resin having β-substituted propenyl group as a pendant, copolymerization can be conducted in combined use of a vinyl monomer to improve the acid introduction ratio in the graft copolymer and to lengthen a chain of polymer of the acid-containing vinyl monomer in the graft copolymer.

In reacting polyolefin resin having β-substituted propenyl group as a pendant with a vinyl monomer having an acid, any of the following methods can be employed for production: for example, a melting/kneading method wherein the reaction is conducted using an extruder, a Banbury mixer, a kneader, a kneader-ruder or the like; a solution reaction method wherein the reaction is conducted in a state of uniform solution using a solvent with dissolution ability; and a solid-state reaction method wherein the reaction is conducted in a state of powder, a sheet or the like.

Among them, a melting/kneading method is more preferable from a standpoint of handiness and economical efficiency.

In addition, the reaction temperature is preferably not less than 20° C.

Here, more preferable temperature is 30 to 400° C. in the case of addition of a radical polymerization initiator, and 100 to 400° C. in the case of no addition thereof.

When the radical polymerization initiator is added at a temperature of less than 30° C., the reaction rate tends to be too low. Similarly, when the reaction is conducted at a temperature of less than 100° C. without addition of the racial polymerization initiator, the reaction rate tends to be too low. On the other hand, when the reaction temperature exceeds 400° C. in either case, the polymerization proceeds too rapidly and the control of the reaction tends to be difficult.

A molded product can be obtained by molding the graft copolymer composition of the present invention into a designated shape. As a method of molding the graft copolymer composition, molding can be conducted by a processing machine generally used for thermoplastic resin, and exemplary methods include calendar molding, an extrusion molding, foam molding, injection molding, vacuum molding, and blow molding. Extrusion molding is preferable from a standpoint of moldability and high gloss appearance. Foam molding is preferable from a standpoint of lower specific gravity. Injection molding is preferable from a standpoint fluidity and high gloss appearance.

Articles which can be obtained by molding the graft copolymer composition of the present invention include: sheet-like molded products such as films and sheets; bulk-like molded products such as plates, rods, and tubes. In the case of molding a sheet-like molded product, T-die extrusion molding or calendar molding are more desirable from a stand point of moldability and appearance. In the case of molding a bulk-like molded product, extrusion molding, blow molding, foam molding, and injection molding are more preferable from a standpoint of moldability and appearance. Specific examples of molded products include: sheet-like molded products such as seat surface material for vehicles, seat surface material for chairs, shrink film for foods; bulk-like molded products such as Automotive moldings for vehicles, weather strips, mud guards, and grips for sticks. Especially, seat surface material for vehicles, automotive moldings, molded products for weather strip are more preferable from a standpoint of adhesive property, scratch resistance, and surface gloss of a molded product. Examples of seat surface material includes surface material for instrument panel, surface material for trim, surface material for body side trim, surface material for luggage side trim, surface material for roof trim, surface material for sun visor, and surface material for pillar trim. Examples of automotive moldings include front window molding, rear window molding, drip molding, door waist molding, rear pillar molding, lock pillar automotive molding side guide molding, belt molding, and roof molding. Examples of weather strip include body side, door seal, side window, trunk rid, tail gate, rear quarter, window shield, glass run, and rear partition. These molded products include products produced by gluing one or more kinds of materials by heat welding or further laminating urethane elastomer on the molded product, multi layered molded films having gravure printing of urethane coating, primers, coating main agents, and molded products covered with hard coating.

The obtained molded products can be collected after use and can be reused as material for molding, and thus it is excellent in recycling.

According to the present invention, the following advantages can be obtained.

The graft copolymer has a structure in which a vinyl polymer segment formed from a vinyl monomer having an acid is suspended in a molecular chain of polyolefin resin segment via a β-substituted propylene group. Therefore, the graft copolymer having less disintegration or crosslinking of polyolefin resin segment and higher introduction ratio of vinyl monomer having an acid can be obtained, compared with a graft copolymer having a structure in which an acid is suspended without β-substituted propylene group, and the obtained graft copolymer and a composition thereof are excellent in adhesive property and scratch resistance.

Further, adhesive property and scratch resistance of the graft copolymer composition can be improved by partial crosslinking.

Furthermore, adhesive property and scratch resistance of the graft copolymer composition can be much improved by allowing it to contain a lubricant.

According to the production methods of the graft copolymer, it is possible to obtain a graft copolymer composition whose molecular weight has not changed while graft reaction and to which much acid has been grafted.

Next, the present invention will be described in detail by referring to Examples and Comparative Examples, but the present invention is not limited thereto. In these examples, "part" and "%" mean "parts by weight" and "% by weight" unless otherwise stated.

Further, each measurement items of each example were obtained in accordance with the following methods.

(1) Melt Flow Rate

Melt flow rate (abbreviated as MFR in tables) was measured in accordance with JIS K 7210 (temperature: 190° C., load: 2.16 kg).

(2) Gel Fraction 1 g of polyolefin resin having α-substituted propenyl group as a pendant or graft copolymer, and 200 g of a mixture of 180 g of cyclohexane and 20 g of dimethylformamide were charged in a Soxhlet extractor, and then extraction was conducted for 24 hours at a temperature of the boiling point of the solvent.

Then, based on the weight (g) of extracted residue obtained by removing cyclohexane and dimethylformamide from cylindrical filter paper and the weight (g) of a sample before extraction, a gel fraction {gel fraction (%)=[(weight of extracted residue (g))/(sample weight (g) before extraction)]×100} was calculated.

(3) Amount of Suspension of β-Substituted Propenyl Group in Polyolefin Resin Having a β-Substituted Propenyl Group as a Pendant 1 g of polyolefin resin having a β-substituted propenyl group as a pendant was added to 200 g cyclohexane and dissolved at 70° C. Thereafter the resultant solution was dropped in 600 g of acetone for reprecipitation.

The precipitate was filtrated and dried, and the resultant product was dissolved in heavy cyclohexane. Then, the amount of suspended β-substituted propenyl group (%, abbreviated as suspension amount in tables) was determined in accordance with the following method using $^1$H-NMR.

In $^1$H-NMR measurement, for example, β-substituted propenyl group (when a substituent is a phenyl group) to be detected are attributable as follows.

2.8 ppm; methylene proton 4.7 and 5.1 ppm; proton of a methylene double bond 7.0 to 7.2 ppm; benzene ring proton Therefore, based on the ratio of the integrated area (A) of proton of methylene double bond to the integrated area (B) of methylene proton (1.3 ppm) derived from ethylene or propylene of polyolefin component or methyl proton (0.8 to 0.9 ppm), and molar fraction (C) of ethylene or propylene in polyolefin resin component, the number of moles (Md=A×C/B) of methylene double bond in one mole of polyolefin resin component can be calculated.

The product (Md×Mp) of the number of moles (Md) of methylene double bond in one mole of polyolefin resin component and the molecular weight (Mp) of β-substituted propenyl group is divided by the molar-molecular weight (Mw) of polyolefin resin, (Md×Mp/Mw), and thereby the suspension amount of β-substituted propenyl group can be calculated (suspension amount of β-substituted propenyl group (%)=Md×Mp/Mw={A×C×Mp/(B×Mw)}×100).

(4) Amount of Suspension of β-Substituted Propylene in Graft Copolymer 1 g of graft copolymer was added to 200 g of a mixture of 180 g of cyclohexane and 20 g of dimethylformamide, and dissolved at 70° C. Thereafter the resultant solution was dropped in 600 g of acetone for reprecipitation.

The precipitate was filtrated and dried, and the resultant product was dissolved in heavy cyclohexane. Then, the amount of suspended β-substituted propylene group (%, abbreviated as suspension amount in tables) was determined in accordance with the following method using $^1$H-NMR.

In $^1$H-NMR measurement, for example, β-substituted propenyl group (when a substituent is a phenyl group) to be detected are attributable as follows.

2.8 ppm; methylene proton 3.7 ppm; methine proton 7.0 to 7.2 ppm; benzene ring proton Therefore, based on the ratio of the integrated area (a) of methine proton to the integrated area (b) methylene proton (1.3 ppm) derived from ethylene or propylene of polyolefin component or methyl proton (0.8 to 0.9 ppm), and molar fraction (c) of ethylene or propylene in polyolefin resin component, the number of moles (Mm=a×c/b) of methine proton in one mole of polyolefin resin component can be calculated.

The product (Mm×Mq) of the number of moles (Mm) of methine proton in one mole of polyolefin resin component and the molecular weight (Mq) of β-substituted propylene group is divided by the mol-molecular weight (Mw) of polyolefin resin (Mm×Mq/Mw), and thereby the suspension amount of β-substituted propylene group can be calculated (suspension amount of β-substituted propylene group (%)=Mm×Mq/Mw={a×c×Mq/(B×Mw)}×100).

(5) Acid Content and Reaction Rate 1 g of graft copolymer was added to 200 g of a mixture of 180 g of cyclohexane and 20 g of dimethylformamide, and the resultant mixture was stirred for 2 hours at 70° C. for dissolving graft copolymer. Thereafter, the resultant solution was dropped in 600 g of acetone for reprecipitation.

The precipitate was filtrated and dried and the resultant product was heat-pressed (230° C., 5 MPa), thereby forming a film with a thickness of 0.2 mm.

With infrared absorption spectrum, the absorbance of peaks attributable to carboxylic acid, anhydrous carboxylic acid, sulfuric acid, andphosphoric acid (carboxylic acid: 1710 to 1730 cm$^{-1}$, anhydrous carboxylic acid: 1760 to 1780 cm$^{-1}$, sulfuric acid: 1010 to 1080 cm$^{-1}$, phosphoric acid: 1180 to 1240 cm$^{-1}$) was measured, and the content (%) of introduced acid or acid anhydride was calculated by a calibration curve method.

Then, the graft reaction rate was calculated (graft reaction rate (%)={content (%) of acid or acid anhydride introduced to graft copolymer/content (%) of feed acid or acid anhydride}×100).

Here, the content (%) of feed acid or acid anhydride means the content (%) of vinyl monomer containing acid or acid anhydride based on the total amount of the vinyl monomer containing feed acid or acid anhydride and polyolefin resin containing β propenyl group in reacting polyolefin resin containing β propenyl group with vinyl monomer containing acid or acid anhydride.

(6) Hardness

The hardness of graft copolymer composition was measured in conformity to JIS K 6253.

(7) Adhesive Property

The graft copolymer composition was molded by heat-compression for 2 minutes at 220° C. and 10 MPa, thereby molding a molded product having 2 mm of thickness and a square plate shape with 80 mm on a side. The molded product was sandwiched by two aluminum plates which have been defatted and have 0.1 mm of thickness and mirror finished surface, and molded by heat-compression for 2 minutes at 200° C. and 10 MPa, thereby forming a molded aluminum product with 0.85 mm of resin thickness.

The resultant product was cut into pieces with 25 mm of width, and conditioned for 24 hours under the conditions of 23° C. and 50% humidity. Thereafter, T-peel strength was measured with a test distance of 60 mm at a pulling rate of 50 mm/min. using an autograph (AGS-H 500N manufactured by Shimadzu Corporation).

(8) Scratch Resistance

A molded product (square plate with 2 mm of thickness and 120 mm on a side) of the graft copolymer was molded and the scratch resistance was evaluated according to three methods shown below.

Scratch Resistance Performance

Using a scratch tester (manufactured by Toyo Seiki Seisaku-sho, Ltd.), a test piece was scratched by a cutter with an arbitrary load applied thereto, and a minimum load that caused a scar on the test piece was measured.

Erichsen Resistance Performance

Using a scratch hardness tester (Model 318 manufactured by Erichsen), an arbitrary load was applied to a ball with 0.5 mmϕ and scratching was conducted, and a minimum load that caused a scar on a test piece was measured.

Wear Resistance Performance

Using a Frictional wear instrument (manufactured by Yasuda Co.), 1000 g of load was placed on a face of 10 mmϕ, and 100 times of reciprocal abrasion was performed with Cotton cloth (No.3). Thereafter, a surface of a test piece was visually observed and evaluated in accordance with the following evaluation standard.

4: when a flaw width is 0.0 to 0.5 mm (0 to 5%)

3: when a flaw width is 0.6 to 2.5 mm (6 to 50%)

2: when a flaw width is 2.6 to 9.5 mm (51 to 95%)

1: when a flaw width is 9.6 to 10.0 mm (96 to 100%)

(9) Tensile Test

A product of graft copolymer (a square plate with 2 mm of thickness, 120 mm on a side) was molded, and subjected to tensile test in conformity to JIS K 6251.

Hereinafter, abridged notations in Examples, Comparative Examples and tables represent the following substances.

PP: block polypropylene (trade name: SunAllomer PB370A manufactured by SunAllomer Ltd.)

PE: polyethylene (tradename: Sumikasen G401manufactured by Sumitomo Chemical Co.)

m-EOR: ethylene-octane copolymer rubber (trade name: Engage 8180 manufactured by DuPont Dow Elastomers L.L.C.)

m-EPDM: ethylene-propylene-diene copolymer rubber synthesized by metallocene catalyst (trade name: Nordel IP4725P manufactured by DuPont Dow Elastomers L.L.C.)

MAN modified PP: maleic acid modified polypropylene (tradename: OREVAC CA100 containing 1% of maleic acid, manufactured by ATOFINA)

MAN modified EPDM: maleic acid modified ethylene-propylene-diene copolymer rubber (trade name: Royaltuf 498 containing 1% of maleic acid, manufactured by Uniroyal)

MSD: 2,4-diphenyl-4-methyl-1-pentene (trade name: Nofmer MSD manufactured by NOF CORPORATION)

H-25B: 2,5-dimethyl-2,5-bis(t-butylperoxy)hexane (trade name: Perhexa 25B manufactured by NOF CORPORATION)

H-TEMPO: 2,2,6,6-tetramethyl-5-hydroxypiperidinyl-1-oxy (manufactured by Hulls)

MAN: maleic anhydride (manufactured by NOF CORPORATION)

AA: acrylic acid (Wako Pure chemical Industries, Ltd.)

ZAA: zinc acetate (Wako Pure chemical Industries, Ltd.)

DVB: divinylbenzene (Wako Pure chemical Industries, Ltd.)

MEG: polyethylene glycol monomethylether (trade name: Uniox 550 manufactured by NOF CORPORATION)

REFERENCE EXAMPLE 1

Production of β Propenyl Group Pendant PP 100 parts of PP (density: 0.9, melt flow rate (JIS K 7210: 230° C., 2.16 kg of load) 1.3 g/10 min.), 5 parts of MSD, 1 part of H-25B, and 1 part of H-TEMPO were mixed for 5 minutes by a mixing/stirring machine, and then the resultant mixture was melt and kneaded at 220° C. in an atmosphere of nitrogen with a biaxial extruder with an internal diameter of 30 mm and an L/D of 30, thereby producing polypropylene resin having 2-phenyl-1-propenyl group as a pendant.

Next, the produced polyolefin resin was analyzed by $^1$H-NMR (AV 400 model manufactured by Bruker Japan Co., Ltd.)

0.8 to 0.9 ppm; methyl proton (B) 3H (495)

1.3 ppm; methylene proton (B) 2H (0)

2.8 ppm; methylene proton 2H (1.02)

4.7 ppm, 5.1 ppm; proton of methylene double bond (A) 2H (1)

7.0 to 7.2 ppm; proton of benzene ring 5H (2.54)

The numerical values in brackets represent relative strength of peaks.

Based on the ratio of the integrated area (A) of proton of methylene double bond to the integrated area (B: since polyolefin resin herein is polypropylene, methyl proton is used) of methyl proton (0.8 to 0.9 ppm) derived from propylene of polyolefin component, and the molar ratio (C: herein the value thereof is 1) of propylene of polyolefin resin component, the number of moles (Mb=C×(A/2)/(B/3)) of unsaturated double bond in one mole of polyolefin resin component is calculated as follows.

$$Mb=1\times(1/2)/(495/3)=0.00303$$

The product (Md×Mp) of the number of moles (Mb) of unsaturated double bond in one mole of polyolefin resin component and the molecular weight (Mp) of β-substituted propenyl group is divided by the mol-molecular weight (Mw) of polyolefin resin (herein polypropylene), (Md×Mp/Mw), and thereby the suspension amount of β-substituted propenyl group can be calculated (suspension amount (%) of β-substituted propenyl group=Md×Mp/Mw=A×C×Mp/(B×Mw)×100).

Herein:

suspension amount (%) of β-substituted propenyl group=0.00303×117/40×100=1.8

Using this PE having 2-phenyl-1-propenyl group as a pendant, the melt flow rate and gel fraction were measured. The results are shown in Table 1.

TABLE 1

| | | | Reference examples | | | |
|---|---|---|---|---|---|---|
| | | | 1 | 2 | 3 | 4 |
| Blended components (parts) | Polyolefin resin | PP | 100 | | | |
| | | PE | | 100 | | |
| | | m-EOR | | | 100 | |
| | | m-EPDM | | | | 100 |
| | Addition cleavage type chain transfer agent | MSD | 5 | 5 | 5 | 5 |
| | Radical polymerization initiator | H-25B | 1 | 1 | 1 | 1 |
| | Radical scavenger | H-TEMPO | 1 | 1 | 1 | 1 |
| Melting/kneading temperature (° C.) | | | 220 | 220 | 180 | 180 |
| Properties of β-substituted propenyl group containing resin | | MFR (g/10 min.) | 12 | 2.4 | 0.9 | 0.5 |
| | | Gel fraction (%) | 0 | 6 | 1 | 2 |
| | | Introduction ratio (%) | 0.9 | 1.8 | 1.9 | 2.0 |

(Reference Example 2: production of PE having β-propenyl group as a pendant)

PE having 2-phenyl-1-propenyl group as a pendant was obtained in the same manner as Reference Example 1 except that polyolefin resin was changed to PE (density: 0.9, melt flow rate (JIS K 7210 (190° C., 2.16 kg of load): 4.0 g/10 min.), and various evaluations were conducted in the same manner. The results are shown in Table 1.

REFERENCE EXAMPLE 3

Production of m-EOR Having β-Propenyl Group as a Pendant m-EOR having 2-phenyl-1-propenyl group as a pendant was obtained in the same manner as Reference Example 1 except that polyolefin resin was changed to m-EOR (melt flow rate (JIS K 7210: 230° C., 2.16 kg of load): 1 g/10 min.) and the melting/kneading temperature was changed to 180° C., and various evaluations were conducted in the same manner. The results are shown in Table 1.

REFERENCE EXAMPLE 4

Production of m-EPDM Having β-Propenyl Group as a Pendant m-EPDM having 2-phenyl-1-propenyl group as a pendant was obtained in the same manner as Reference Example 1 except that m-EPDM (melt flow rate (JIS K 7210: 230° C., 2.16 kg of load): 0.5 g/10 min.) was used instead of polyolefin resin and the melting/kneading temperature was changed to 180° C., and the various evaluations were conducted in the same manner. The results are shown in Table 1.

EXAMPLE 1

Production and Performance of Graft Copolymer Composition in Which an Acid is Suspended 100 parts of PP having β-propenyl group as a pendant synthesized in Reference Example 1, 5 parts of MAN, and 1 part of H-25B were mixed for 5 minutes by a mixing/stirring machine, and then the resultant mixture was melt and kneaded at 220° C. in a nitrogen atmosphere by a biaxial extruder having 30 mm of internal diameter and L/D of 30, thereby producing PP having polymaleic anhydride grafted.

Next, the produced graft copolymer was analyzed by $^{1}$H-NMR (AV 400 model manufactured by Bruker Japan Co., Ltd.).

0.8 to 0.9 ppm; methyl proton (b) 3H (557.8)

1.3 ppm; methylene proton (b) 2H (0)

2.8 ppm; methylene proton 2H (1.02)

3.7 ppm; methine proton (b) 2H (1)

7.0 to 7.2 ppm; proton of benzene ring 5H (2.54)

The numerical values in brackets represent relative strength of peaks.

Based on the ratio of the integrated area (a) of methine proton to the integrated area (b: since polyolefin resin herein is polypropylene, methyl proton was used) of methyl proton (0.8 to 0.9 ppm) derived from propylene of polyolefin component, and the mole ratio (c: herein the value thereof is 1) of propylene of polyolefin resin component, the number of moles (Mm=c×(a/2)/(b/3) of methine in one mole of polyolefin resin component is calculated as follows.

$$Mm=1\times(1/2)/(557.8/3)=0.00269$$

The product (Mm×Mq) of the number of moles (Mm) of methine in one mole of polyolefin resin component and the molecular weight (Mq) of β-substituted propylene group is divided by the mol-molecular weight (Mw) of polyolefin (herein polypropylene) (Mm×Mq/Mw), and thereby the suspension amount of β-substituted propylene group can be calculated (suspension amount (%) of β-substituted propylene group=Mm×Mq/Mw={a×c×Mq/(b×Mw)}×100).

Herein, suspension amount (%) of β-substituted propylene group=0.00269×117/40×100=0.8

Using this composition, the melt flow rate, gel fraction, acid amount and reaction rate were measured.

In addition, this graft copolymer composition was molded by heat-compression for 2 minutes at 220° C. and 10 MPa, thereby molding a molded product having 2 mm of thickness and a square plate shape with 80 mm on a side. Then, the obtained product was evaluated in terms of the adhesive property, scratch resistance, and tensile property, and the results are shown in Table 2.

TABLE 2

| | | | Examples | | | Comparative |
|---|---|---|---|---|---|---|
| | | | 1 | 2 | 3 | Example 1 |
| Blended components (parts) | Polyolefin resin | Reference example 1 | 100 | 100 | 100 | — |
| | | PP | — | — | — | 100 |
| | Vinyl monomer containing acid | MAN | 5 | 0.1 | — | 5 |
| | | AA | — | — | 5 | — |
| | Radical polymerization initiator | H-25B | 1 | 1 | 1 | 1 |
| Properties of graft copolymer composition containing acid | | MFR (g/10 min.) | 27 | 20 | 22 | 46 |
| | | Gel fraction (%) | 0 | 4 | 0 | 0 |
| | | Content of β-substituted propylene (%) | 0.8 | 0.4 | 0.8 | — |
| | | Acid content (%) | 3.20 | 0.14 | 2.60 | 0.42 |
| | | Reaction rate (%) | 64 | 70 | 52 | 8 |
| Performances of graft copolymer composition containing acid | Hardness | Shore D (JISA) | 71 | 70 | 72 | 71 |
| | Adhesive property | Peeling strength (N/mm) | 13 | 5 | 12 | 5 |
| | Flaw resistance | Scratch resistance (N) | 1.5 | 0.5 | 1.7 | 0.2 |
| | | Erichsen resistance (N) | 9.0 | 8.8 | 9.0 | 8.0 |
| | | Wear resistance (point) | 4 | 4 | 4 | 4 |
| | Tensile property | Maximum stress (MPa) | 35 | 32 | 34 | 28 |
| | | Elongation (%) | 600 | 660 | 680 | 580 |

EXAMPLE 2

A graft copolymer composed of PP having polymaleic acid grafted was obtained in the same manner as Example 1 except that the amount of MAN was changed from 5 parts to 0.1 parts, and the various evaluations were conducted in the same manner. The results are shown in Table 2

EXAMPLE 3

A graft copolymer composed of PP having polyacrylic acid grafted was obtained in the same manner as Example 1 except that 5 parts of AA was used instead of 5 parts of MAN, and the various evaluations were conducted in the same manner. The results are shown in Table 2.

EXAMPLE 4

PE composition having polymaleic anhydride grafted was obtained in the same manner as Example 1 except that 100 parts of PE having β-propenyl group as a pendant was used instead of 100 parts of PP having β-propenyl group as a pendant, and the various evaluations were conducted in the same manner. The results are shown in Table 3.

TABLE 3

| | | | Examples | | | |
|---|---|---|---|---|---|---|
| | | | 4 | 5 | 6 | 7 |
| Blended components (parts) | β-substituted propenyl group-containing resin | Reference Example 2 | 100 | — | — | — |
| | | Reference Example 3 | — | 100 | — | — |
| | | Reference Example 4 | — | — | 100 | 100 |
| | Vinyl monomer containing acid | MAN | 5 | 5 | 5 | 5 |
| | Radical polymerization initiator | H-25B | 1 | 1 | 1 | — |
| | Radical scavenger | H-TEMPO | — | — | — | 1 |
| Performance of graft copolymer containing acid | | MFR (g/10 min.) | 1.8 | 2.5 | 0.4 | 1 |
| | | Gel fraction (%) | 6 | 2 | 3 | 1 |
| | | Content of β-substituted propylene (%) | 1.6 | 1.7 | 1.8 | 1.7 |
| | | Acid content (%) | 2.70 | 3.20 | 3.50 | 3.10 |
| | | Reaction rate (%) | 54 | 64 | 67 | 77 |
| Performances of graft copolymer composition containing acid | Hardness | Shore D (JISA) | (55) | (55) | (55) | (55) |
| | Adhesive property | Peeling strength (N/mm) | 12 | 18 | 20 | 18 |
| | Flaw resistance | Scratch resistance (N) | 1.7 | 1.3 | 1.8 | 1.8 |
| | | Erichsen resistance (N) | 2.5 | 1.2 | 1.2 | 1.5 |
| | | Wear resistance (point) | 4 | 3 | 3 | 2 |

TABLE 3-continued

| | | Examples 4 | 5 | 6 | 7 |
|---|---|---|---|---|---|
| Tensile property | Maximum stress (MPa) | 17 | 1.6 | 6.7 | 7.0 |
| | Elongation (%) | 420 | 770 | 1100 | 1200 |

EXAMPLE 5

M-EOR composition having polymaleic anhydride grafted was obtained in the same manner as Example 1 except that 100 parts of m-EOR having β-propenyl group as a pendant, which was produced in Reference Example 3, were used instead of 100 parts of PP having β-propenyl group as a pendant in obtaining PP composition having polymaleic anhydride grafted, and the various evaluations were conducted in the same manner. The results are shown in Table 3.

EXAMPLE 6 m-EPDM composition having polymaleic anhydride grafted was obtained in the same manner as Example 1 except that 100 parts of m-EPDM having β-propenyl group as a pendant, which was produced in Reference Example 4, were used instead of 100 parts of PP having β-propenyl group as a pendant in obtaining PP composition having polymaleic anhydride grafted, and the various evaluations were conducted in the same manner. The results are shown in Table 3.

EXAMPLE 7 m-EPDM composition having polymaleic anhydride grafted was obtained in the same manner as Example 6 except that 1 part of H-TEMPO was added in obtaining m-EPDM composition having polymaleic anhydride grafted, and the various evaluations were conducted in the same manner. The results are shown in Table 3.

EXAMPLE 8

Production of Graft Copolymer Composition 30 parts of graft copolymer composition obtained in Example 1 and 70 parts of graft copolymer composition obtained in Example 7 were melt and kneaded for 10 minutes in a 75 cc Banbury mixer (BH-75 manufactured by Toyo Seiki Seisaku-sho, Ltd.) at 100 rpm, thereby producing a graft copolymer composition.

Further, this graft copolymer composition was molded by heat-compression for 2 minutes at 220° C. and 10 MPa, thereby molding a molded product having 2 mm of thickness and a square plate shape with 80 mm on a side. Thereafter, the obtained product was evaluated in terms of adhesive property, scratch resistance, and tensile property, and the results are shown in Table 4.

TABLE 4

| | | | Examples 8 | 9 | 10 | 11 | Comparative Example 2 |
|---|---|---|---|---|---|---|---|
| Blended components (parts) | Graft copolymer composition | Example 1 (PP) | 30 | — | 30 | 30 | — |
| | | Example 7 (m-EPDM) | 70 | 70 | — | — | — |
| | | MAN modified PP | — | — | — | — | 30 |
| | | MAN modified EPDM | — | — | — | — | — |
| | Polyolefin resin | PP | — | 30 | 70 | — | 70 |
| | | m-EPDM | — | — | — | 70 | — |
| Performances of graft copolymer composition containing acid | MFR | MFR (g/10 min.) | 0.4 | 1.2 | 35 | 1.4 | 30 |
| | Hardness | Shore D (JISA) | | | | | |
| | Adhesive property | Peeling strength (N/mm) | (87) | (86) | 70 | (87) | 70 |
| | Flaw resistance | scratch resistance (N) | 3.1 | 2.4 | 1.0 | 2.0 | 0.3 |
| | | Erichsen resistance (N) | 1.5 | 1.4 | 9.0 | 1.0 | 9.0 |
| | | Wear resistance (point) | 4 | 4 | 4 | 4 | 4 |
| | Tensile property | Maximum stress (MPa) | 9.5 | 9.0 | 23.3 | 8.8 | 31.0 |
| | | Elongation (%) | 630 | 630 | 550 | 670 | 500 |

EXAMPLE 9

A graft copolymer composition was obtained in the same manner as Example 8 except that 30 parts of PP were used instead of 30 parts of graft copolymer composition obtained in Example 1, and the obtained product was molded. Thereafter, the same evaluations on the molded product were conducted. The results are shown in Table 4.

EXAMPLE 10

A graft copolymer composition was obtained in the same manner as Example 8 except that 70 parts of PP were used instead of 70 parts of graft copolymer composition obtained in Example 7, and the obtained product was molded. Then, the same evaluations on the molded product were conducted. The results are shown in Table 4.

EXAMPLE 11

A graft copolymer composition was obtained in the same manner as Example 8 except that 70 parts of m-EPDM were used instead of 70 parts of graft copolymer composition obtained in Example 7, and the obtained product was molded. Then, the same evaluations on the molded product were conducted. The results are shown in Table 4.

EXAMPLE 12

A graft copolymer composition was obtained in the same manner as Example 8 except that 30 parts of PP and 30 parts of graft copolymer composition obtained in Example 7 and 40 parts of m-EPDM were used instead of 30 parts of graft copolymer composition obtained in Example 1, and 70 parts of graft copolymer composition of Example 7, and the obtained product was molded. Then, the same evaluations on the molded product were conducted. The results are shown in Table 5.

obtained product was molded. Then, the same evaluations on the molded product were conducted. The results are shown in Table 5.

EXAMPLE 15

A graft copolymer composition was obtained by further adding 5 parts of MEG to the graft copolymer composition obtained in Example 14, and the obtained product was molded. Then, the same evaluations on the molded product were conducted. The results are shown in Table 5.

COMPARATIVE EXAMPLE 1

100 parts of PP (density: 0.9, melt flow rate (JIS K 7210: 230° C., 2.16 kg of load) 1.3 g/10 min.), 5 parts of MAN, and 0.5 parts of H-25B were mixed for 5 minutes by mixing/stirring machine, and then melt and kneaded by a biaxial extruder having 30 mm of internal diameter and L/D of 30 (in a nitrogen atmosphere at 220° C.), thereby obtaining PP composition having polymaleic anhydride directly grafted. The various evaluations were conducted. The results are shown in Table 2.

TABLE 5

| | | | Examples | | | | Comparative |
|---|---|---|---|---|---|---|---|
| | | | 12 | 13 | 14 | 15 | Example 3 |
| Blended components (parts) | Graft copolymer composition | Example 1 (PP) | — | — | — | — | — |
| | | Example 7 (m-EPDM) | 30 | 30 | 30 | 30 | — |
| | | MAN modified PP | — | — | — | — | — |
| | | MAN modified EPDM | — | — | — | — | 30 |
| | Polyolefin resin | PP | 30 | 30 | 30 | 30 | 30 |
| | | m-EPDM | 40 | 40 | 40 | 40 | 40 |
| | Metal ion | 20% ZAA aqueous solution | — | 9 | 9 | 9 | 9 |
| | Crosslinking agent | H-25B | — | — | 0.5 | 0.5 | 0.5 |
| | Crosslinking aid | DVB | — | — | 0.3 | 0.3 | 0.3 |
| | Lubricant | MEG | — | — | — | 5 | 5 |
| Performances of graft copolymer composition containing acid | MFR | MFR (g/10 min.) | 1.8 | 1.5 | 1.3 | 1.7 | 2.3 |
| | Hardness | Shore D (JISA) | (88) | (88) | (88) | (88) | (87) |
| | Adhesive property | peeling strength (N/mm) | 11 | 10 | 10 | 9 | 2 |
| | Flaw resistance | scratch resistance (N) | 1.4 | 1.5 | 1.7 | 1.9 | 0.3 |
| | | Erichsen resistance (N) | 1.2 | 1.5 | 1.9 | 2.7 | 1.0 |
| | | wear resistance (point) | 4 | 4 | 4 | 4 | 4 |
| | Tensile property | maximum stress (MPa) | 8.8 | 9.2 | 9.6 | 9.5 | 9.0 |
| | | elongation (%) | 690 | 640 | 590 | 570 | 570 |

EXAMPLE 13

A graft copolymer composition was obtained by further adding 9 parts of 20% ZAA aqueous solution to the graft copolymer composition obtained in Example 12, and the obtained product was molded. Then, the same evaluations on the molded product were conducted. The results are shown in Table 5.

EXAMPLE 14

A graft copolymer composition was obtained by further adding 0.5 parts of H-25B and 0.3 parts of DVB to the graft copolymer composition obtained in Example 12, and the

COMPARATIVE EXAMPLE 2

A graft copolymer composition was obtained in the same manner as Example 10 except that 30 parts of MAN modified PP were used instead of 30 parts of graft copolymer obtained in Example 1, and the obtained product was molded. Then, the same evaluations on the molded product were conducted. The results are shown in Table 4.

COMPARATIVE EXAMPLE 3

A graft copolymer composition was obtained in the same manner as Example 15 except that 30 parts of MAN modified EPDM were used instead of 30 parts of graft copolymer composition obtained in Example 7, and the obtained composition was molded. Then, the same evaluations on the molded product were conducted. The results are shown in Table 5.

According to the comparison between Example 1 and Comparative Example 1 (Table 2), PP of the present invention having polymaleic anhydride grafted has higher content of maleic anhydride, compared with the case wherein conventional PP was used as material in the reaction for obtaining a graft copolymer composition by grafting polymaleic anhydride. Further, it has been revealed that PP of the present invention is excellent in adhesive property and scratch resistance.

In addition, according to the comparison between Example 2 and Comparative Example 1 (Table 2), PP of the present invention having polymaleic anhydride grafted exhibits equal or better adhesive property and scratch resistance of graft copolymer composition, despite lower acid introduction amount, compared with the case wherein conventional PP was used as material. Therefore, it is clear that the performances of the graft copolymer composition of the present invention have been improved because the composition has a structure in which polymaleic acid is grafted via β-substituted propylene group, rather than directly, to polyolefin resin segment.

Further, according to the comparison between Example 10 and Comparative Example 2 (Table 4), it is obvious that PP of the present invention having polymaleic anhydride group grafted is excellent in adhesive property and scratch resistance for PP composition, compared with commercially available maleic anhydride modified PP.

Moreover, according to the comparison between Example 15 and Comparative Example 3 (Table 5), when EPDM of the present invention having maleic anhydride grafted is used as a modifier, compared with commercially available maleic anhydride modified EPDM described in Japanese Patent Publication No. 2-51455, it has become obvious that the obtained resin composition is excellent in adhesive property and scratch resistance.

INDUSTRIAL APPLICABILITY

The graft copolymer of the present invention has a structure in which a vinyl polymer segment formed from a vinyl monomer having an acid is suspended in a molecular chain of polyolefin resin segment via a β-substituted propylene group. Therefore, in comparison with a graft copolymer having a structure in which an acid is suspended without the intermediate of β-substituted propylene group, the graft copolymer of the present invention has less disintegration or crosslinking of polyolefin resin segment, and enable the obtainment of a graft copolymer having higher introduction ratio of vinyl monomer having an acid. Consequently, the graft copolymer and a composition thereof are excellent in adhesive property and scratch resistance.

Further, according to a method for producing the graft copolymer of the present invention, the change of molecular weight during graft reaction is small and it is possible to obtain a graft copolymer composition having larger amount of grafted acid.

From the graft copolymer composition of the present invention, various molded products can be obtained, for example: sheet-like molded products such as sheets and films; bulk-like molded products such as plates, rods, and tubes. These molded products can be collected after use and reused as material for molding, and thus they are excellent in recycling.

The invention claimed is:

1. A graft copolymer having a structure in which a vinyl polymer segment formed from a vinyl monomer having an acid group is suspended in a molecular chain of polyolefin resin segment via a β-substituted propylene group.

2. The graft copolymer according to claim 1, wherein the β-substituted propylene group is a group represented by the formula (A):

[Formula A]

$$-CH_2-\underset{\displaystyle |}{\overset{R^1}{\phantom{|}}}\!\!\!\!\!\!CH-CH_2- \qquad (A)$$

wherein $R^1$ represents a phenyl group, cyano group or —COORm (Rm represents an alkyl group having 1 to 4 carbon atoms).

3. The graft copolymer according to claim 1, wherein the polyolefin resin segment is a polypropylene resin segment.

4. The graft copolymer according to claim 1, wherein the polyolefin resin segment is an olefin elastomer segment.

5. The graft copolymer according to claim 1, wherein the content of the vinyl polymer segment is 0.1 to 30% by weight.

6. A graft copolymer composition containing the graft copolymer according to claim 1.

7. The graft copolymer composition according to claim 6, wherein partial crosslinking is present.

8. The graft copolymer composition according to claim 6, wherein the composition contains further a lubricant.

9. A molded product obtainable by molding the graft copolymer composition according to claim 6.

10. A method for producing a graft copolymer by reacting a vinyl monomer having an acid group with polyolefin resin having a β-substituted propenyl group as a pendant, wherein the polyolefin resin having a β-substituted propenyl group as a pendant is produced by reacting an addition-fragmentation chain transfer agent with polyolefin resin.

11. The graft copolymer according to claim 2, wherein the polyolefin resin segment is a polypropylene resin segment.

12. The graft copolymer according to claim 2, wherein the polyolefin resin segment is an olefin elastomer segment.

13. The graft copolymer according to claim 2, wherein the content of the vinyl polymer segment is 0.1 to 30% by weight.

14. A graft copolymer composition containing the graft copolymer according to claim 2.

15. The graft copolymer composition according to claim 14, wherein partial crosslinking is present.

16. The graft copolymer composition according to claim 14, wherein the composition contains further a lubricant.

17. A molded product obtainable by molding the graft copolymer composition according to claim 14.

18. A method for producing a graft copolymer by reacting a vinyl monomer having an acid group with polyolefin resin having a β-substituted propenyl group as a pendant by heating and mixing at a temperature of not less than 30° C. and not more than 400° C., wherein the polyolefin resin having a β-substituted propenyl group as a pendant is produced by reacting an addition-fragmentation chain transfer agent with polyolefin resin.

* * * * *